United States Patent Office 3,692,602
Patented Sept. 19, 1972

3,692,602
PROCESS FOR PREPARING A THERMOPLASTIC RESIN FOAM
Hiroshi Okada, Atsushi Osakada, and Satoyuki Minami, Sonoyama, Otsu-shi, Shiga-ken, Toshikazu Aoki, Beppo, Otsu-shi, Shiga-ken, Tetsuo Hisamori, Aobadai, Kohoku-ku, Yokohama-shi, Kanagawa-ken, and Hironobu Koyanagi and Hiromi Otsuka, Sonoyama, Otsu-shi, Shiga-ken, Japan, assignors to Toyo Rayon Company, Ltd., Tokyo, Japan
Filed June 23, 1969, Ser. No. 835,718
Int. Cl. B32b 5/20
U.S. Cl. 156—79                 20 Claims

ABSTRACT OF THE DISCLOSURE

A process for making thermoplastic resin foam comprising forming a laminate comprised of a sheet of foamable thermoplastic interposed between and bonded to outer thermoplastic resin films. When the laminate is heated, a foam product is formed which, because the outer films limit the escape of foaming gas, may be thinner and/or have higher expansion ratios than thermoplastic resin foams heretofore producible by any other atmospheric process.

BACKGROUND AND FIELD OF THE INVENTION

The present invention relates to a process for preparing a thermoplastic resin foam. More particularly, the present invention relates to a process for preparing a thermoplastic resin foam free of discolorations and having excellent mechanical and chemical properties.

The preparation of thermoplastic resin foams including heat activated chemical foaming agents and cross-linking agents is well known in the prior art. Generally the thermoplastic resin-foaming agent-cross-linking agent mixture is formed into a sheet and then heated, first to a temperature to effect cross-linking and then to a temperature to effect foaming. It is also known to omit the heat activated cross-linking agent partially or entirely and accomplishing some or all of the necessary cross-linking by irradiating the sheet.

Generally, however, upon foaming by heating under atmospheric pressure, some degree of the foam-producing gas escapes to the atmosphere rapidly and the effective utilization ratio of the generated gas becomes low. Moreover, this ratio decreases as the amount of foaming agent increases. As a result, it has not been practically possible to obtain a foam having an expansion ratio higher than 30 to 40.

Further, if a colored foaming agent, such as azodicarbonamide, is used, a part of the foaming agent which is not decomposed remains dispersed in the surface of the resin foam thereby causing discoloration. For this reason, thermoplastic resin foams free of discoloration have heretofore been very difficult to obtain. One possible solution to this problem, prolonging the heating time to completely decompose the foaming agent has been found to result in a roughened foam surface due to melting of polymer. Thus the heating process can only be prolonged to a limited degree and as a result discoloration is not completely avoided.

Another difficulty in the prior art has been that because of the escape of foam-producing gas to the atmosphere, it has been very difficult to prepare a thin foam sheet having a sufficiently high expansion ratio.

Further, a chemical foaming agent when decomposed generally forms a gas and a solid residue. This solid residue includes considerable amounts of sublimating substances which adhere to the internal walls and components of the heating and foaming apparatus, thereby causing operational as well as maintenance problems.

For some applications, it is desirable to produce a foam sheet by floating the foamable resin on a heated bath. A problem with this has been that a tortoise shell-like pattern is usually formed on the surface of the foam due to entrapped foaming gas at the foam liquid interface and uneven heat transmission as a result thereof.

It is therefore an object of the present invention to provide a process for preparing a thermoplastic resin foam sheet, in which the loss of the foaming gas is minimized, the effective utilization thereof is improved, and the attainable foam expansion ratio is substantially increased.

Another object of the present invention is to provide a process for preparing a thermoplastic resin foam sheet having excellent surface properties such as surface smoothness, hardness and luster, and freedom from discoloration.

A further object of the present invention is to provide a process for preparing a thermoplastic resin foam free of foaming agent residue.

BRIEF DESCRIPTION OF THE INVENTION

It has now been found that these objects can be met and the aforementioned shortcomings avoided by laminating a thermoplastic film at least on both the upper and lower surfaces of a foamable thermoplastic sheet before activating the foaming agent therein.

DETAILED DESCRIPTION OF THE INVENTION

The present invention is particularly pointed out and distinctly claimed in the concluding portion of this specification. It may be better understood, however, together with the further objects and advantages thereof, by reference to the following detailed description, and accompanying drawings, in which FIG. 1 is a graph showing the relationship between the amount of uniformly dispersed azodicarbonamide foaming agent contained in an expandable polyethylene sheet and the amount of gas lost to the atmosphere per unit surface area of the sheet;

FIG. 2 is a graph showing the relationship between the amount of radiation received by an expandable polyethylene sheet uniformly dispersed with azodicarbonamide and the amount of gas lost to the atmosphere per unit surface area of the sheet;

FIG. 3 and FIG. 4 express the relationships of FIG. 1 and FIG. 2 as ratios of escaped gas (or gas lost to the atmosphere) to the total amount of gas generated;

Figure 10:
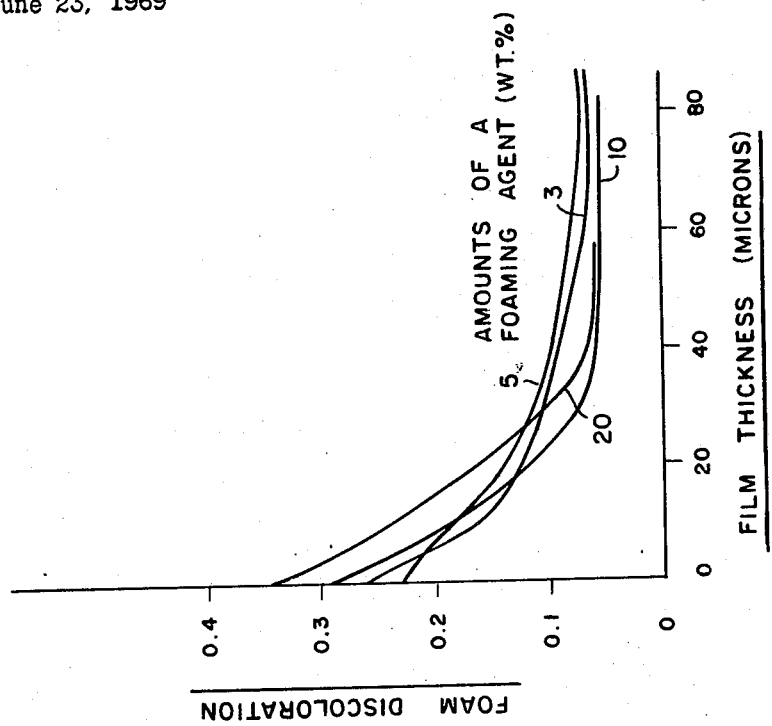
Figure 9:
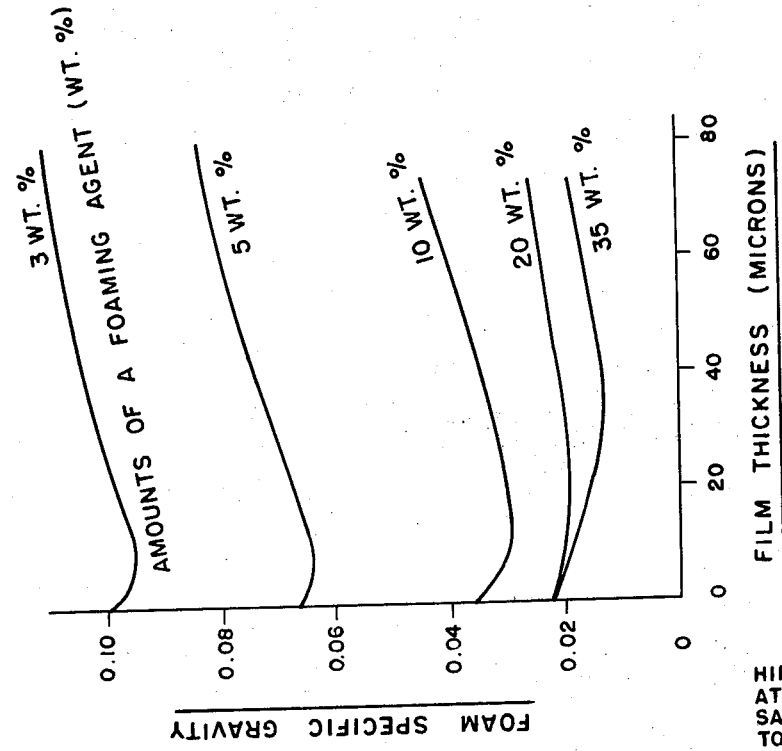

FIG. 9 is a graph showing the relationship between the post-foaming thickness of films laminated to the outer surfaces of foamed polyethylene sheet and the specific gravities of the foam products for various foaming agent concentrations; and FIG. 10 is a graph showing the relationship of outer laminate film thicknesses to the degree of discoloration on the outer surface of the foam product for various foaming agent concentrations.

The present invention relates to a process for preparing a thermoplastic resin foam sheet by heating a laminate comprised of a foamable cross-linked thermoplastic resin sheet including a uniformly dispersed chemical foaming agent which sheet is interposed between cross-linked thermoplastic resin films to a temperature above the softening temperature of the resin constituting the laminate and above the decomposition temperature of the chemical foaming agent.

The thermoplastic resins referred to here include olefin and vinyl chloride polymers and copolymers comprised of at least 50 mole percent of olefins having 2–8 carbon atoms in their monomeric constituents. Specifically included in this group are polyethylene, polypropylene, polybutene, poly - 4 - methyl pentene - 1, and copolymers of aforementioned olefins with vinyl acetate, vinyl chloride, acrylic acid alkyl ester (alkyl group having 1–8 carbon atoms), and methacrylic acid alkyl ester (alkyl group having 1–8 carbon atoms). Mixtures of these polymers and copolymers, either with each other or with other materials such as synthetic rubber, wherein the other material comprises less than 50 mole percent of the mixture, may also be used.

Further, in the process of the present invention, these thermoplastic resins may be mixed with additives, such as weathering agents, paraffin-like extenders, plasticizers, pigments, nonflammability agents and anti-static agents. In particular, foaming agents and chemical cross-linking additives are essential to the process of the present invention, although the latter may be reduced or omitted if cross-linking is induced by irradiating the mixture.

With respect specifically to the chemical foaming agents, these are usually materials which decompose at some specific temperature to produce a gas. Specific examples of such materials are azodicarbonamide, hydrazodicarbon amide, a salt of a metal of Group I-A or 2-A of the Periodic Table, for example, Na, K, Li, Ba, Sr, Cu and Mg, of which especially Na, Ba and Sr are preferable, of azodicarboxylic acid, 4,4'-oxy bis (benzene sulfonyl semicarbazide), bis-benzenesulfonyl hydrazide, N,N'-dinitrosopentamethylene tetramine, trihydrazine-sym-triazene, diazoaminobenzene, N,N'-dimethyl-N,N'-dinitrosoterephthalamide and azobisisobutyronitrile.

The amount of these chemical foaming agents required varies depending upon the particular agent used and the desired expansion ratio (i.e., volume of material after foaming to volume before foaming). Normally, however, 0.1–50%, by weight based on the thermoplastic resin, of the foaming agent is required and preferably 1–40% is used.

These thermoplastic resins may be cross-linked by various types of radiation, which will be discussed more fully below, or by heat activated chemical cross-linking agents.

If a chemical cross-linking agent is used, it must be a material which decomposes above the softening temperature of the resin to produce a material which causes cross-linking of the polymers in the resin material. Examples of such materials are benzoyl peroxide, 2,4-dichloro benzoyl peroxide, lauryl peroxide, acetyl peroxide, methylethylketone peroxide, cyclohexanone peroxide, tert-butyl perbenzoate, di-α-cumyl peroxide, 2,5-dimethyl-2,5-di-tert-butyl hexane, 2,5 - dimethyl - 2,5 - di-tert-butyl hexene-3, and di-tert-butyl perterephthalate. A mixture of at least two of the foregoing may also be used.

The amount of these cross-linking agents required varies depending upon the kind of resin and the degree of cross-linking desired. Normally, however, it is 0.1–5% by weight, preferably 0.3–2% by weight based on the thermoplastic resin.

Whether cross-linking is effected by irradiation or heat-activated chemical cross-linking agents, the cross-linking process may be accelerated, particularly in resins which normally do not tend to cross-link readily, by a chemical cross-linking assistant or accelerator. Typically these accelerators are difunctional unsaturated compounds, such as divinyl benzene, diaryl phthalate and diaryl maleate.

To further facilitate cross-linking in the event ultraviolet radiation is being used for this purpose, the resinous mixture may also include ultraviolet "sensitizer" or absorbers.

Generally, the foregoing thermoplastic resins, in powder or chip form, are blended by mixing them with the necessary additives in a conventional mixer such as that known as a Henschel mixer. Thereafter the mixture is formed into a sheet by an extruder, calender or roll, using either dry or wet (with solvent added) processes. Where heating is necessary to the sheet forming process, the material may be heated to above the softening point of the resin but the temperature should be kept below the decomposition temperature of any foaming or cross-linking agent in the mixture.

The foregoing discussion of sheet making processes, compositions and additives, except for that part of the discussion pertaining to foaming agents, pertains equally to the methods of making and to the composition of the outer films disposed on opposite surfaces of the central foamable resin lamina used in the process of the present invention. However, this central foamable lamina may or may not be of the same composition as the films between which it is interposed. In this respect, the laminate may be either heterogeneous or homogeneous. As to chemical foaming agent, it may be included into the outerfilm in an amount not losing the objective effect of the present invention. In any event, the various adjacent lamina must be adherent to one another and must have a softening point lower than the foaming temperature of the foamable composition. This is because at the same time the central thermoplastic resin lamina foams by decomposition of the chemical foaming agent, the outer thermoplastic films must be drawn biaxially. If the outer thermoplastic resin films have a softening point higher than the foaming temperature, the foam product is badly warped or its expansion is limited and the desired thermoplastic resin foam sheet cannot be obtained.

The thickness of the outer thermoplastic resin films may vary, depending upon the resin used and the expansion ratio desired, between 1 and 1000 microns. Preferably, the thickness of these films, after foaming of the central lamina is 5–100 microns. Films less than 1 micron thick are unsatisfactory because they do not adequately prevent the loss or escape of the gas generated in the foaming process.

With regard to the foamable sheet-outer film laminate used in the process of the present invention, any method for making such a laminate is acceptable so long as the lamina do not separate during the foaming process. Heat fusion of the lamina is one such method. Extrusion lamination is another. In extrusion lamination, the central foamable lamina and the outer film lamina are extruded simultaneously and pressed together before or just after they leave the extrusion die. It should be pointed out that while this laminate must have outer films on the opposite sides of the central foamable sheet, this foamable sheet may consist of dual foamable sheet thicknesses or some combination of foamable and non-foamable film layers. Such combinations must also be fused or bonded to prevent separation during the foaming process and heat fusion or extrusion lamination may also be used for this purpose.

While one or more of the lamina used in the process of the present invention may be cross-linked, either by radiation or heat activation of a chemical cross-linking agent, before the laminate is formed, it is preferable to make the laminate first and then to cross-link all of the lamina thereof simultaneously. However, in some case it may be desirable to cross-link one or more of the lamina, either partially or fully, prior to lamination in order to produce different degrees of cross-linking in the various lamina. The cross-linking, in any event, may be effected by irradiating the laminate or by heating it to a temperature below the foaming temperature of the foamable composition or by some combination of radiation and heat treatment.

Any of the known methods for irradiating resinous materials to effect cross-linking may be used in producing the laminate used in the process of the present invention. High energy electrons, neutrons, gamma rays, alpha rays, X-rays, and ultraviolet rays, may be used in the dosage range of 0.2–40 mrads. However, electron rays, gamma rays, and ultraviolet rays are most effective, and a dosage range of 2–30 mrads is preferred.

After a cross-linked laminate has been formed, the laminate is heated to the decomposition or activation temperature of the foaming agent and the foamed product is formed. The foaming temperature varies depending upon the kind of resin and the kind of foaming agent used. Therefore, it is not possible to specify a temperature or range of temperatures for this part of the process. However, this temperature must be above the softening point of the thermoplastic resin of the film and that of the foamable sheet and also above the decomposition temperature of the foaming agent used. At upper end the foaming temperature is limited only by the decomposition temperature of the resin used. As pointed out above, generally cross-linking is effected prior to foaming in the process of the present invention. However, it is possible in a single heat treatment step to activate sequentially a chemical cross-linking agent and a foaming agent, thereby to effect both cross-linking and foaming in a single continuous process.

In heating the laminate of the present invention, either to cross-link or to foam, any known method may be used. Heated air, an infrared or other type of radiant heater, and a liquid heating bath, such as molten salt or molten alloy are typical heating means for such purposes. Combinations of these means may also be used. For example, the laminate may be floated on a heating bath and heated from above by heated air or a radiant heater.

The process of the present invention and the product thereof has certain notable characteristics, including the following:

(1) Because the outer films prevent escape of foaming gas from the foamable sheet, it is possible to increase the effective utilization ratio of the generated gas and to produce a foam having an expansion ratio on the order of 40 to 50. The quality of the product is also more consistent.

(2) Foam having a high degree of whiteness or freedom from discoloration of the surface of the foam due to incomplete decomposition of a foaming agent may be obtained.

(3) Foam having improved surface characteristics, such as surface smoothness, hardness and luster can be produced.

(4) Foam properties, except cell size and properties due to thereof, can be controlled independent of degree of cross-linking.

(5) There is no soil inside the foaming apparatus due to sublimating substances accompanying escaping foaming gas, and it is possible to prevent adverse effect on the product owing thereto.

(6) In case a liquid bath is used for heating from below, a tortoise shell-like pattern brought about on the foam surface contacting the liquid bath is avoided. This makes it possible to make the two surfaces of the foam the same. With respect to liquid bath heating, prior art foams are known to cause sludge formation in the bath due to collection of foaming agent residue. This problem is also avoided with the present invention.

(7) Foaming of a very thin expandable sheet is possible.

(8) Because the foam is laminated with a cross-linked film, the mechanical properties, weatherability and chemical resistance of the foam are improved. Anti-static properties and other physical characteristics can be imparted to the foam product by the use of films having these characteristics.

(9) By including pigments in one or more of the lamina, colored foam or foam having a surface area colored may be produced.

The characteristics of the foam product of the process of the present invention may be better understood by reference to the figures.

Figure 2:
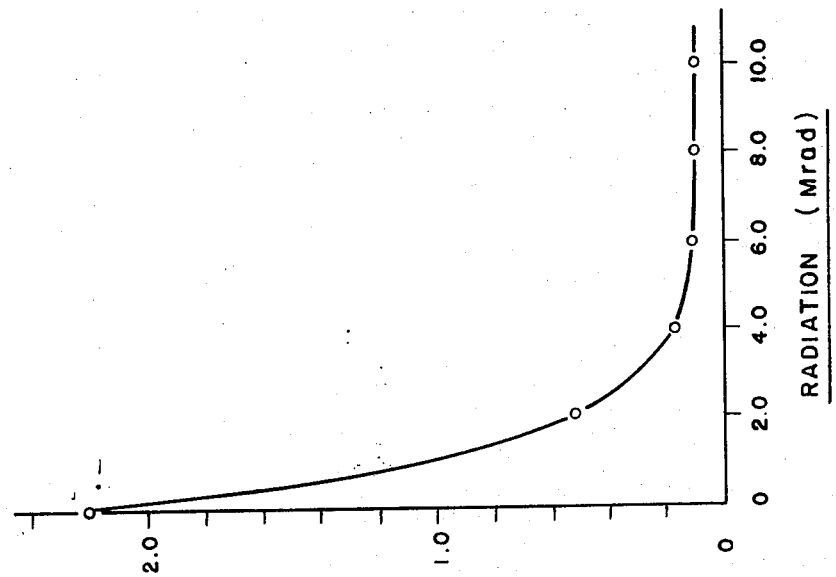
Figure 1:
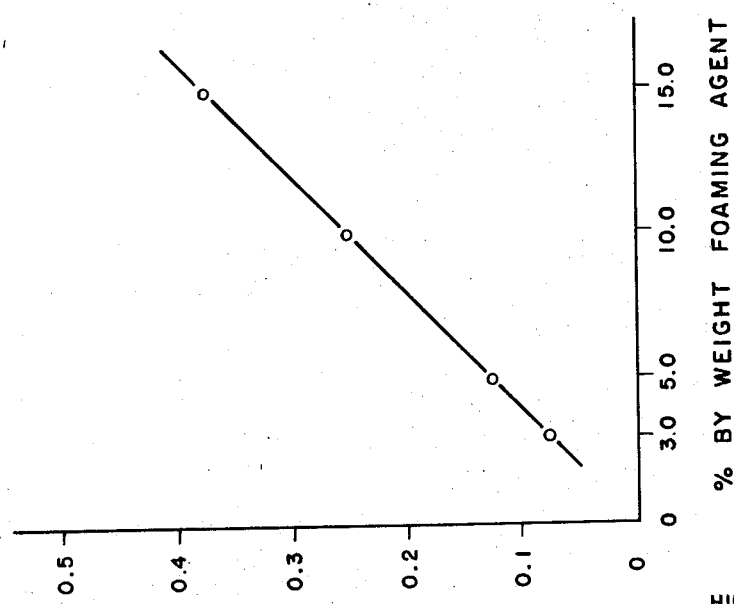
Figure 4:
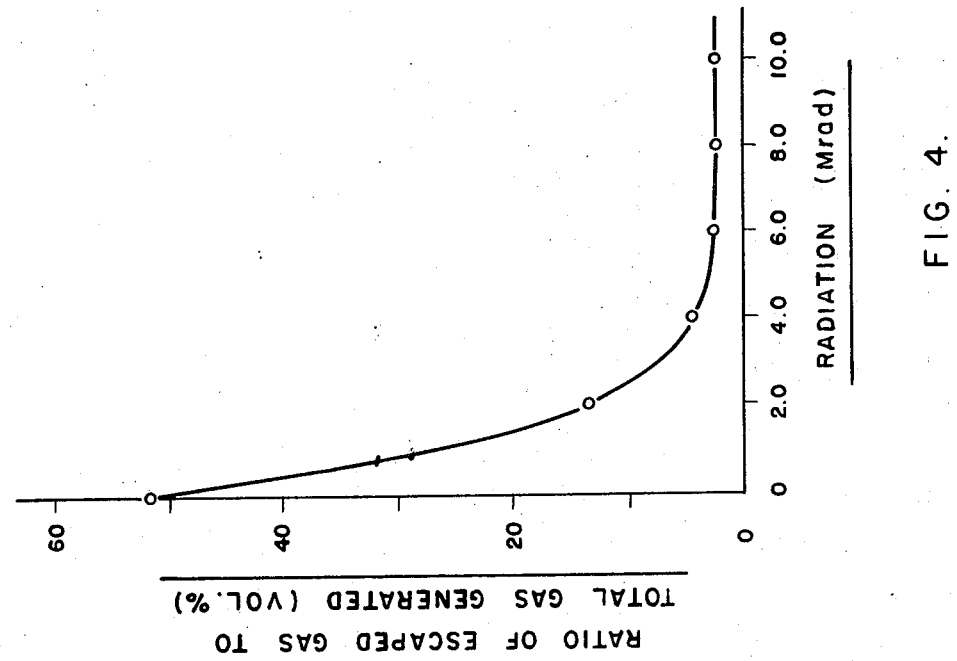
Figure 3:
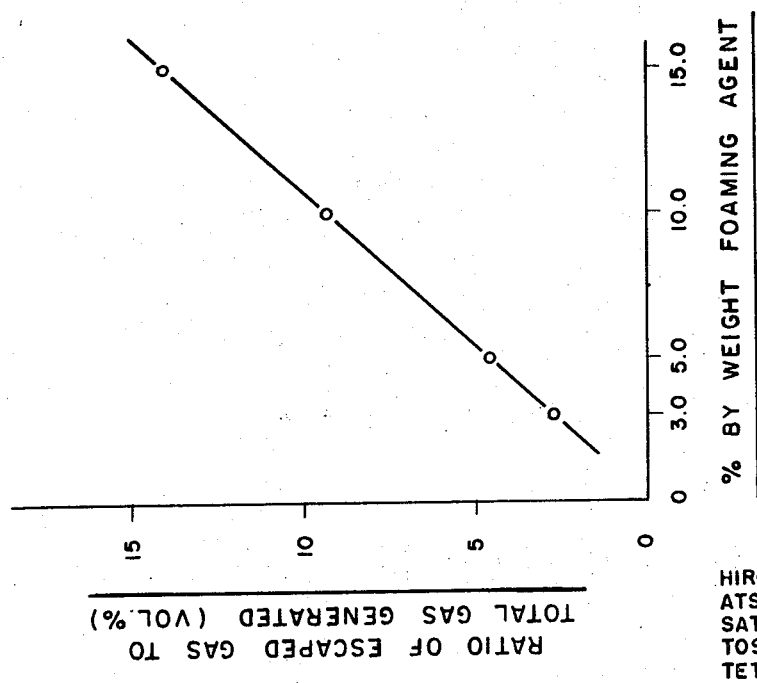

Referring particularly to FIGS. 1 and 2, it is shown that the amount of foaming gas which escapes per unit surface area of the sheet increases as the concentration of foaming agent increases and decreases as the radiation dosage increases. The same relationship expressed as a ratio of gas which escapes to that generated is seen in FIGS. 3 and 4. The data illustrated in these figures is based on prior art foamable polyethylene sheets, 3 millimeters thick, with azodicarbonamide as the foaming agent. These sheets were foamed by heating in a 230° C. silicone bath. The samples upon which FIGS. 1 and 3 are based were exposed to 3.5 mrads of radiation while the samples upon which FIGS. 2 and 4 are based contained 10% by weight foaming agent.

It has now been found that the loss of gas illustrated by FIGS. 1–4 can be prevented by laminating to the upper and lower surfaces of an expandable sheet, films of proper thicknesses.

Figure 5:
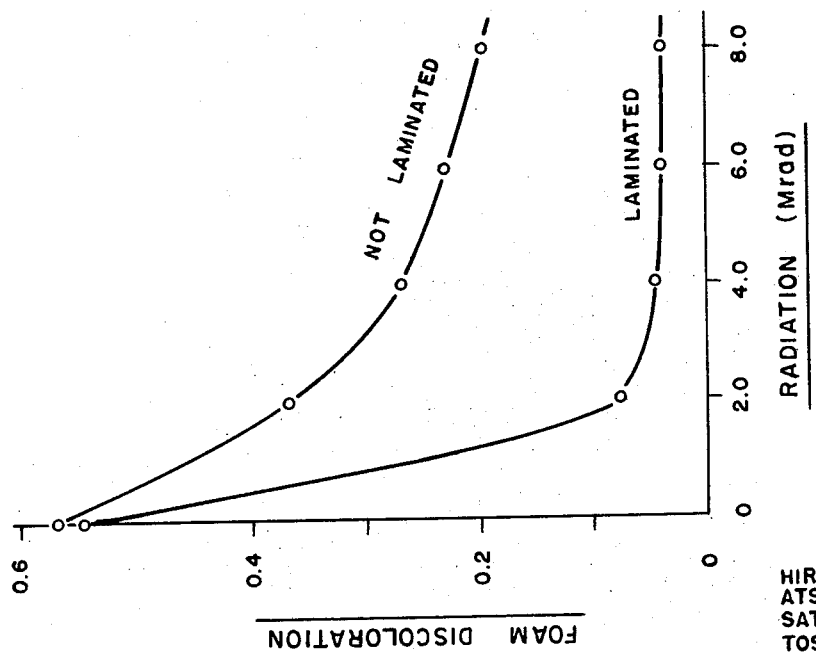
FIG. 5 is a graph showing the relationship of radiation to foam surface discoloration both for the unlaminated foam of the prior art and for the laminated foam sheet of the present invention.

In FIG. 5 there is shown the relationship of surface yellowness or discoloration of a prior art foam sample, i.e., one that is not laminated, to radiation and the same relationship for a laminated foam produced in accordance with the present invention. The dependency of the discoloration in the prior art foam on the extent of the radiation treatment is evident. By comparison, the laminated foam was superior in freedom from discolorations and practically independent of extent of radiation treatment above 2 mrads. Similar results have been obtained in comparison tests relating specific gravity to radiation treatment. The results of these tests are seen in FIG. 6.

Figure 6:
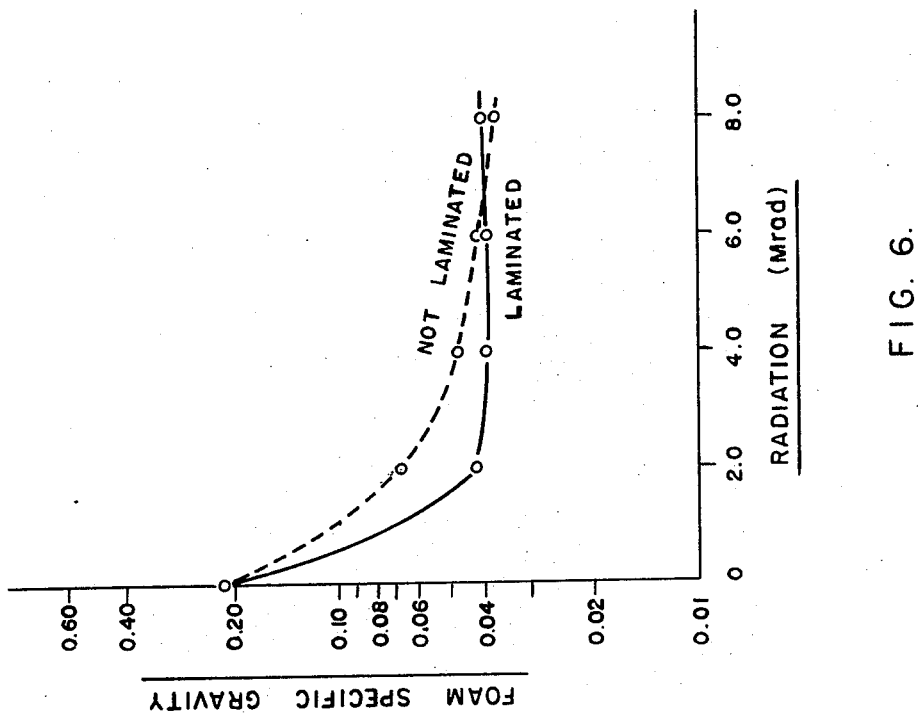
FIG. 6 is a graph showing the relationship between radiation and foam specific gravity both for laminated and unlaminated foams.

The thickness of the expandable polyethylene sheet upon which FIG. 5 and FIG. 6 are based is 3.0 mm. These sheets also included as a foaming agent azodicarbonamide in an amount of 10.0% by weight. The thickness of the film on the laminated samples, after foaming, was about 20 microns. These samples were laminated first, then irradiated and foamed in a silicone bath at 230° C. for 3 minutes.

Figure 8:
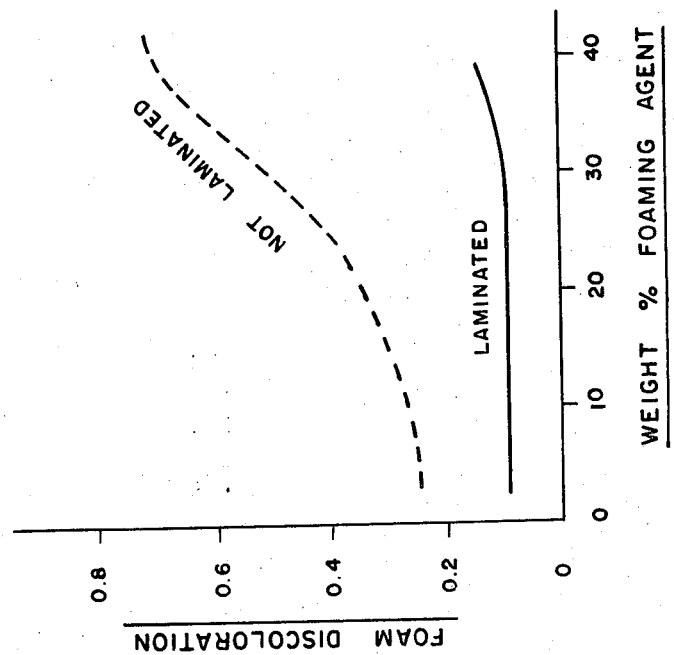
FIG. 8 is a graph of the degree of discoloration versus foaming agent concentration.
Figure 7:
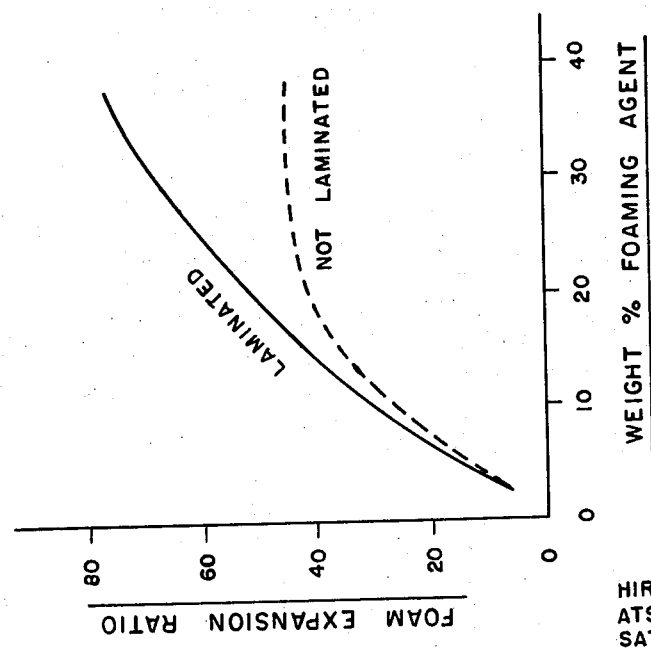
FIG. 7 is a graph showing the relationship of foaming agent concentration in the foamable composition to the expansion ratio of the foam product both for unlaminated and laminated foams.

Similar graphical comparisons of laminated and unlaminated samples and the relationship therein of foam expansion ratios and degrees of discoloration to weight percent foaming agent are made in FIGS. 7 and 8. The foamable sheets in the test samples in these cases were 3.0 mm. thick, the laminating films were about 20 microns thick after foaming, the samples were irradiated with 4 mrads, the foaming agent was azodicarbonamide, and foaming was accomplished by heating the samples in a silicone bath at 230° C. for 3 minutes. It should be noted that in these comparisons, the product of the present invention was superior in effecting foaming magnification throughout the range of expansion ratios and that expansion ratios much above 40 could not be obtained by atmospheric foaming of the unlaminated sample representative of the prior art.

In similar samples, the thickness of the laminating film, i.e., the outer thermoplastic film laminated to the opposite surfaces of a central foamable sheet in accordance with the present invention, has been varied and the relationship thereof to foam specific gravity and foam discoloration has been studied. The results of these studies are graphically illustrated in FIGS. 9 and 10, which also show how this relationship is affected by different foaming agent concentrations.

In all these cases, of course, these relationships may be somewhat altered by different degrees of cross-linking, different foaming temperatures, etc.

Some examples of the process of the present invention will now be described.

Example 1

With 90 parts by weight of Mirason #16 low density polyethylene (specific gravity 0.923) manufactured by Mitsui Polychemical Co., Ltd., 10 parts by weight of a foaming agent, azodicarbonamide, were blended; the blended mixture was melted and mixed completely in a monoaxial extruder to obtain a sheet 3.6 mm. thick. On both surfaces of this sheet, a 0.10 mm. thick film consisting of Mirason #16 was hot pressed to thereby obtain a foamable sheet 3.8 mm. thick in which the film was laminated on the surface layers. This sheet was irradiated on both surfaces with 3 mrads from an electron beam accelerator. Thereafter the sheet was floated on a molten metal bath at 230° C. and by heating and foaming the sheet from above with an infrared heater, a foam 6.5 mm. thick having a specific gravity of 0.036 was obtained. A similar polyethylene sheet not laminated with the polyethylene films was treated and foamed in the similar way for purposes of comparison. A comparison of the properties of these foam products is shown in Table 1.

TABLE 1

| Foam | Unlaminated | Laminated |
| --- | --- | --- |
| Foam thickness, mm | 6.0 | 6.5 |
| Specific gravity | 0.040 | 0.036 |
| Degree of surface discloration | 0.26 | 0.11 |
| Surface hardness | 26 | 29 |
| Tensile strength, kg./cm.² | 3.5 | 4.0 |

The discoloration or "degree of yellowness" of the surface was measured using Hunter's method with an HTR meter (SEP-I type), and the hardness of the surface was measured with an Asker hardness meter. As is apparent from Table 1, the product of the present invention had a lower specific gravity, apparently lost less gas, had a higher expansion ratio, and better surface color than the unlaminated material representative of the prior art. The laminated foam was also superior in other physical properties.

Example 2

In comparison samples similar to those in Example 1, an ultraviolet absorbent, namely Tinuvin P (manufactured by Geigy Co.), was included in the foam product surface to the extent of about 0.3 weight percent of polyethylene. These samples were used as pipe covers for insulating outdoor water piping. After 6 months the tensile strength of the no-laminated foam was 2.0 kg./cm.² (retaining ratio about 60%), whereas the laminated foam of the present invention had a tensile strength of 3.8-3.9 kg./cm.² (retaining ratio above 90%).

Example 3

With a composition similar to that used in Example 1, the central foamable sheet was made a three-layer structure, each layer 1.2 mm. thick. In the two outer layers of this three-layer structure were included 0.5% by weight of a red pigment. As a result a foam having the same physical properties shown in Example 1 (except with respect to coloration) was obtained. Moreover, its cross section had a laminate structure of red-white-red.

Example 4

With a composition similar to that used in Example 1, 2.0% by weight of azodicarbonamide was added to the outer films. The thickness of each of the layers was made 300 microns. The central layer and these upper and lower films were irradiated with 3.0 and 2.5 mrads respectively. Thereafter they were laminated by heat fusing. Upon heating and foaming as in Example 1, the thickness of the entire laminate was 4.2 mm. In this case escape of the foaming gas from the foam surface was entirely not recognized and a foam, as shown in Table 2, having some cells on the surface skin layer was obtained.

TABLE 2

| | |
| --- | --- |
| Foam thickness mm | 6.8 |
| Specific gravity | 0.038 |
| Degree of surface yellowness | 0.09 |
| Surface harness | 33 |
| Tensile strength kg./cm.² | 4.2 |

Example 5

A composition including 94% by weight of Mirason #16, 5% by weight of a foaming agent, azodicarbonamide, and 1% by weight of an anti-static agent, Resistant PE 132, manufactured by Daiichi Kogyo Seiyaku Kabushiki Kaisha, was blended, melting, mixed, and extruded, by a monoaxial extruder, to form a 2.6 mm. thick sheet. From two auxiliary extruders, low density polyethylene was extruded into two 100 micron films and laminated onto either side of said first sheet forming die by conjugated die to 2.8 mm. thick laminate. Both surfaces of this laminate were irradiated with 7 mrads of electrons. The laminate was then heated and foamed by heated air and infrared rays. The resultant product was compared to an unlaminated foam, without an anti-static additive. The results are shown in Table 3.

TABLE 3

| Foam | Unlaminated | Laminated |
| --- | --- | --- |
| Foam thickness, mm | 4.0 | 4.3 |
| Specific gravity | 0.107 | 0.102 |
| Degree of surface yellowness | 0.17 | 0.06 |
| Surface hardness | 56 | 66 |
| Tensile strength, kg./cm.² | 14 | 16 |

The laminate foam of this example, when sliced, had an average foam cell diameter of 170 microns. When vacuum formed into a display package it was exhibited in a showcase for a month with no noticeable accumulation of dust. By comparison, the unlaminated sample had an average foam cell diameter of 160 microns and a display package formed thereof gathered a conspicous amount of dust in a month's time in an exhibit case. With the addition of an anti-static compound to the unlaminated prior art product to reduce its attraction to dust, the foam cell diameter became 250 microns.

Example 6

Sumikasen G402 low density polyethylene (manufactured by Sumitomo Chemical Industries Co., Ltd.) with 3% by weight of azodicarbonamide foaming agent in the central layer thereof, was formed, as in Example 5, into a 1.7 mm. thick laminate with 100 micron thick films on both surfaces. Both surfaces of the laminate were irradiated with 7 mrads and the laminate thereafter was floated on a molten salt bath at 230° C. and heated and foamed from above by heated air at 300° C. A similar sheet without the laminated outer films was similarly foamed for purposes of comparison. The results of this comparison are listed in Table 4.

TABLE 4

| Foam | Unlaminated | Laminated |
| --- | --- | --- |
| Foam thickness, mm | 2.1 | 2.3 |
| Foam specific gravity | 0.169 | 0.161 |
| Degree of surface whiteness | 0.15 | 0.05 |
| Surface hardness | 63 | 71 |
| Tensile strength, kg./cm.² | 27 | 34 |
| Tortoise shell-like pattern on the lower surface | Yes | No |

Further, from both foam sheets, packings of a diameter of 30 mm. were struck. Said packings were made lids of 100 cc. glass bottles each containing 80 grams of water. Water loss at room temperature and reduced pressure (below 1 mm. Hg absolute) was then checked over a period of time. When the closing torque of the lid was 15 kg.-cm., almost no difference was observed. However, when the closing torque was 5 kg.-cm., a water loss of 0.05–0.10 gram/hour was observed with the lid made of the unlaminated foam product, whereas with the laminated foam lid no loss was observed after 10 hours. This indicates a difference in surface smoothness.

As shown in the above Table 4, in the case of foaming on a salt bath, a tortise shell-like pattern on the lower surface could not be avoided. Because of the difference in upper and lower surfaces, such foams have been unsatisfactory for use as a packing material. Now, as indicated in Table 4, this problem can be avoided.

Example 7

Eraslen 401A chlorinated polyethylene (manufactured by Showa Denko Kabushiki Kaisha), mixed with 0.3% by weight of dicumyl peroxide cross-linking agent, was heat laminated to both the upper and lower surfaces of a central foamable layer similar, except for the omission of the anti-static agent, to that described in Example 5. Prior to lamination, this foamable sheet was cross-linked by irradiation with an electron beam accelerator. A foam having about the same thickness and specific gravity as in Example 5 was then obtained. However, when this foam was compared with an unlaminated polyethylene foam it was far superior in high frequency sealability to a vinyl chloride sheet. The unlaminated foam showed hardly any adherability, whereas in the former a good result was obtained.

Example 8

Polypropylene having an intrinsic viscosity of 2.0–2.3, manufactured under the trade name Noblens by Mitsui Chemical Industries Co., Ltd., was blended with 0.8% by weight dicumyl peroxide, 3% by weight divinyl benzene, and 10% by weight azodicarbonamide. This combination was melted and mixed completely and formed into a 2.0 mm. thick sheet by a biaxial extruder. To both the upper and lower surfaces of said sheet 150-micron thick films were heat laminated. The composition of these films was the same as the central sheet or lamina except for the omission of the foaming agent, azodicarbonamide, and the inclusion of 0.3% by weight of an antioxidant, 2,2-thio-bis-(4-methyl-6-tert-butylphenol). Thereafter, the laminate was heated and foamed in a salt bath at 250° C. When the resultant product was compared with unlaminated foam, the following characteristics were noted.

TABLE 5

| Foam | Unlaminated | Laminated |
|---|---|---|
| Foam thickness, mm | 3.8 | 4.1 |
| Foam specific gravity | 0.038 | 0.034 |
| Degree of surface yellowness | 0.32 | 0.10 |
| Tensile strength, kg./cm.² | 6.5 | 8.1 |

In the unlaminated foam and the laminated foam when the antioxidant was omitted, the resin surface was oxidized and became very brittle during foaming. Unless about 1 mm. was sliced and removed from these surfaces, surface properties could not be measured and the product would not be practical for any industrial use.

Example 9

Extrusion lamination was used to form a laminate in which the central foamable layer composition was the same as in Example 1, except for the inclusion of 0.1 part dicumyl peroxide and 1.0 part of 2,5-dimethyl-2,5-ditertbutyl hexane. Films, 0.60 mm. thick of Evaflex #560 (manufactured by Mitsui Polychemical Co., Ltd.) ethylene-vinyl acetate copolymer, containing 1.0% by weight of a red pigment on one side of the laminate and 1.0% by weight of blue pigment on the other side of the laminate were irradiated with 5 mrads of electron rays prior to laminate formation. Thereafter, by heating at about 130° C. a first stage cross-linking was carried out and, in heated air at 200° C., the laminate was heated and foamed while second stage cross-linking occurred. As a result, a foam, with one surface red and the other surface blue, was obtained.

Example 10

To both surfaces of a 1 mm. thick low density polyethylene sheet containing 5% by weight of azodicarbonamide, a 500-micron thick sheet of ethylene-vinyl acetate copolymer containing about 12% by weight of vinyl acetate was heat laminated to form a 2 mm. thick sheet. Thereafter, both surfaces were irradiated with 4 mrads of electron rays from a Van de Graaf accelerator in air. Finally, this sheet was immersed in a salt bath and heated to 230–240° C. for about 2 minutes. The sheet foamed and 2.9 mm. thick foam sheet covered on both surfaces by a 150-micron thick ethylene-vinyl acetate copolymer film was obtained. This foam sheet had about 4–5 times the tensile strength of an unlaminated sheet. This film could be used at a temperature near its melting point. The degree of yellowness of this foam was 0.12 and that of the unlaminated foam to which it was compared was 0.35.

Example 11

On both surfaces of a 300-micron thick sheet of an ethylene-vinyl acetate copolymer with a vinyl acetate content of 8% by weight, which copolymer sheet also contained 10% by weight of azodicarbonamide, a 200-micron thick film of low density polyethylene was heat laminated. Thereafter, both surfaces of this laminate were irradiated with 2 mrads of electron rays from a Van de Gaaf accelerator. Finally, when this laminate was immersed in a salt bath heated to 230–240° C. to foam, a 500-micron thick foam sheet, both surfaces of which were covered by low density polyethylene, was obtained.

The tensile strength of this foam sheet was about 10 times that of an unlaminated sheet, and this sheet could endure temperatures of 120–130° C. This laminated foam sheet also had an expansion ratio of about 30 while an unlaminated sheet 300 microns thick failed to form a normal foam due to escape of foaming gas.

Example 12

On both surfaces of a 500-micron thick calender-formed sheet comprised of polyvinyl chloride with dioctyl phthalate, zinc oxide, diaryl phthalate and dinitrosopentamethylene tetramine, a 200-micron thick polyvinyl chloride sheet of the same composition as above except not containing dinitrosopentamethylene tetramine was heat laminated. Thereafter, both surfaces of this laminate were irradiated with 6 mrads of electron rays. Finally, the laminate was immersed in a silicone bath heated to 200° C. to foam. A foam sheet having a thickness of about 900 microns and an expansion ratio of about 15 was thus obtained. The tensile strength of this sheet was about 7–8 times that of an unlaminated sheet. In heat resistance and chemical resistance, especially this sheet was superior to the conventional sheet not cross-linked and not laminated with a film. The degree of surface yellowness of the foam product was 0.15.

Example 13

Two 1 mm. thick low density polyethylene sheets containing 5% by weight of azodicarbonamide, and an interposed 1 mm. thick sheet, of an ethylene-vinyl acetate copolymer containing about 8% by weight of vinyl acetate were heat laminated. Thereafter, to both surfaces of this laminate, a 300-micron thick film of an ethylene-vinyl acetate copolymer was further laminated by heat fusing and both surfaces of this laminate were exposed to 6 mrads of electron rays from a Van de Graaf accelerator. Finally, when said laminate was foamed in a salt bath heated to 230° C., 3.8 mm. thick foam sheet was obtained.

This sheet was excellent in mechanical properties, especially tensile strength, tear strength and flexing strength. By comparison, a non-cross-linked ethylene-vinyl acetate copolymer sandwiched in a similar laminate melted at 100° C. and separated from the other lamina upon the application of a force. The laminate made in accordance with the present invention, however, retained its integrity at 140–150° C. The degree of yellowness of the foam product was 0.16 and the surface of the foam was free of the tortoise shell-like pattern typical of salt bath foamed unlaminated products.

Example 14

The 1 mm. sheet of low density polyethylene and the 500-micron sheet of ethylene-vinyl acetate copolymer used in Example 10 were heat laminated in the sequence of polyethylene/ethylene-vinyl acetate copolymer/polyethylene/ethylene-vinyl acetate copolymer/polyethylene, and further to both outermost surfaces of this sheet, a 100-micron polyethylene film was heat laminated. Thereafter, both surfaces of the sheet were exposed to 8 mrads of electron rays from a Van de Gaaf accelerator. Finally the sheet was foamed in a salt bath heated to 230–240° C. The thickness of the foamed product was 6.2 mm. and the degree of surface yellowness 0.12. No tortoise shell-like pattern was apparent. As compared to that obtained by foaming polyethylene only, this product was a much smoother surface. Moreover, it had excellent mechanical properties, especially tensile strength, flexing strength, tear strength and compression strength. Further, as compared to that obtained by laminating non-cross-linked ethylene-vinyl acetate copolymers, this foamed sheet could be used at higher temperatures.

Example 15

On both surfaces of a 500-micron thick polybutene-1 sheet containing 10% by weight of azodicarbonamide and 3% by weight of divinyl benzene, a 300-micron thick film of an ethylene-vinyl acetate copolymer was heat laminated. Thereafter, both surfaces of the laminate were exposed to 3 mrads of gamma rays. Finally, when the laminate was foamed in a salt bath heated to 220–230° C., a foam sheet consisting of a 800-micron thick foam layer of polybutene-1 and about 30-micron thick ethylene-vinyl acetate copolymer film layers was obtained. The obtained foam sheet was superior in heat resistance and chemical resistance to a polybutene-1 foam sheet laminated with non-cross-linked film of an ethylene-vinyl acetate copolymer. The degree of surface yellowness of the product was 0.16, no tortoise shell-like pattern was recognized on the surface of the foam and the foam was excellent in surface smoothness.

What is claimed is:

1. A process for preparing a thermoplastic resin foam having smooth surfaces which comprises preparing a composite foamable sheet by heat-adhering thermoplastic resin films having a thickness of 5 to 100 microns on the outer surfaces of a thermoplastic resin sheet containing a chemical foaming agent at a temperature above the softening temperature of said resin films and resin sheet but below the activation temperature of said chemical foaming agent, crosslinking said thermoplastic resin films and said thermoplastic resin sheet and thereafter heating said composite foamable sheet to a temperature above the softening temperature of the thermoplastic resins and above the decomposition temperature of said chemical foaming agent.

2. A process according to claim 1, wherein both said films and said sheet is cross-linked prior to the lamination thereof.

3. A process according to claim 1, wherein either of said films and sheet is cross-linked prior to the lamination thereof and the other is cross-linked after the lamination thereof.

4. A process according to claim 1, wherein said laminate is partially cross-linked by irradiation and partially cross-linked by activating a heat decomposable chemical cross-linking agent contained therein.

5. A process according to claim 1, wherein said sheet includes 0.1–50% by weight of said chemical foaming agent based on said thermoplastic resin.

6. A process according to claim 1, wherein said sheet includes 1–40% by weight of said chemical foaming agent based on said thermoplastic resin.

7. A process according to claim 1, wherein said chemical foaming agent is a compound selected from the group consisting of azodicarbonamide, hydrazodicarbonamide, and N,N'-dinitrosopentamethylene tetramine.

8. A process according to claim 1, wherein said chemical foaming agent is a salt of a metal of Group 1–A and 2–A of the Periodic Table of azodicarboxylic acid.

9. A process according to claim 1, wherein the thickness of said thermoplastic resin film is 1–1000 microns after foaming.

10. A process according to claim 1, wherein the thickness of said thermoplastic resin film is 5–100 microns after foaming.

11. A process according to claim 1, wherein the thickness of said chemical foaming agent-containing thermoplastic resin sheet is less than 300 microns before foaming.

12. A process according to claim 1, wherein said thermoplastic resin is a polyvinyl chloride.

13. A process according to claim 1, wherein said thermoplastic resin is a polyolefin.

14. A process according to claim 13, wherein said polyolefin resin is selected from the group consisting of polyethylene, polypropylene and an ethylene-vinyl acetate copolymer.

15. A process according to claim 1, further including exposing said laminate to high energy radiation prior to the foaming thereof to cause cross-linking of said thermoplastic resins.

16. A process according to claim 15, wherein the dosage of said radiation is within the range of 0.2–40 mrads.

17. A process according to claim 15, wherein the dosage of said radiation is within the range of 2–30 mrads.

18. A process according to claim 1, wherein each of said thermoplastic resin films and said sheet includes a chemical cross-linking agent which is activated prior to the foaming of said laminate.

19. A process according to claim 18, wherein said thermoplastic resin contains 0.1–5% by weight of a heat decomposition-type cross-linking agent.

20. A process according to claim 18, wherein the said thermoplastic resin contains 0.3–2% by weight of a heat decomposition-type cross-linking agent.

References Cited

UNITED STATES PATENTS

| 3,463,687 | 8/1969 | Folsom et al. | 156—79 |
| 3,519,527 | 7/1970 | Crowley | 156—79 X |
| 3,189,243 | 6/1965 | Lux | 161—161 UX |
| 3,372,100 | 3/1968 | Charlesby | 204—159.15 |
| 3,458,337 | 7/1969 | Rugg | 156—79 X |
| 3,488,714 | 1/1970 | Walters et al. | 161—161 |
| 3,097,150 | 7/1963 | Rainer et al. | 156—272 |

CARL D. QUARFORTH, Primary Examiner

E. E. LEHMANN, Assistant Examiner

U.S. Cl. X.R.

156—272; 161—161